Aug. 3, 1948.  H. E. NOFZ  2,446,241
SEAT SLIDE STRUCTURE
Filed May 7, 1945  3 Sheets-Sheet 3
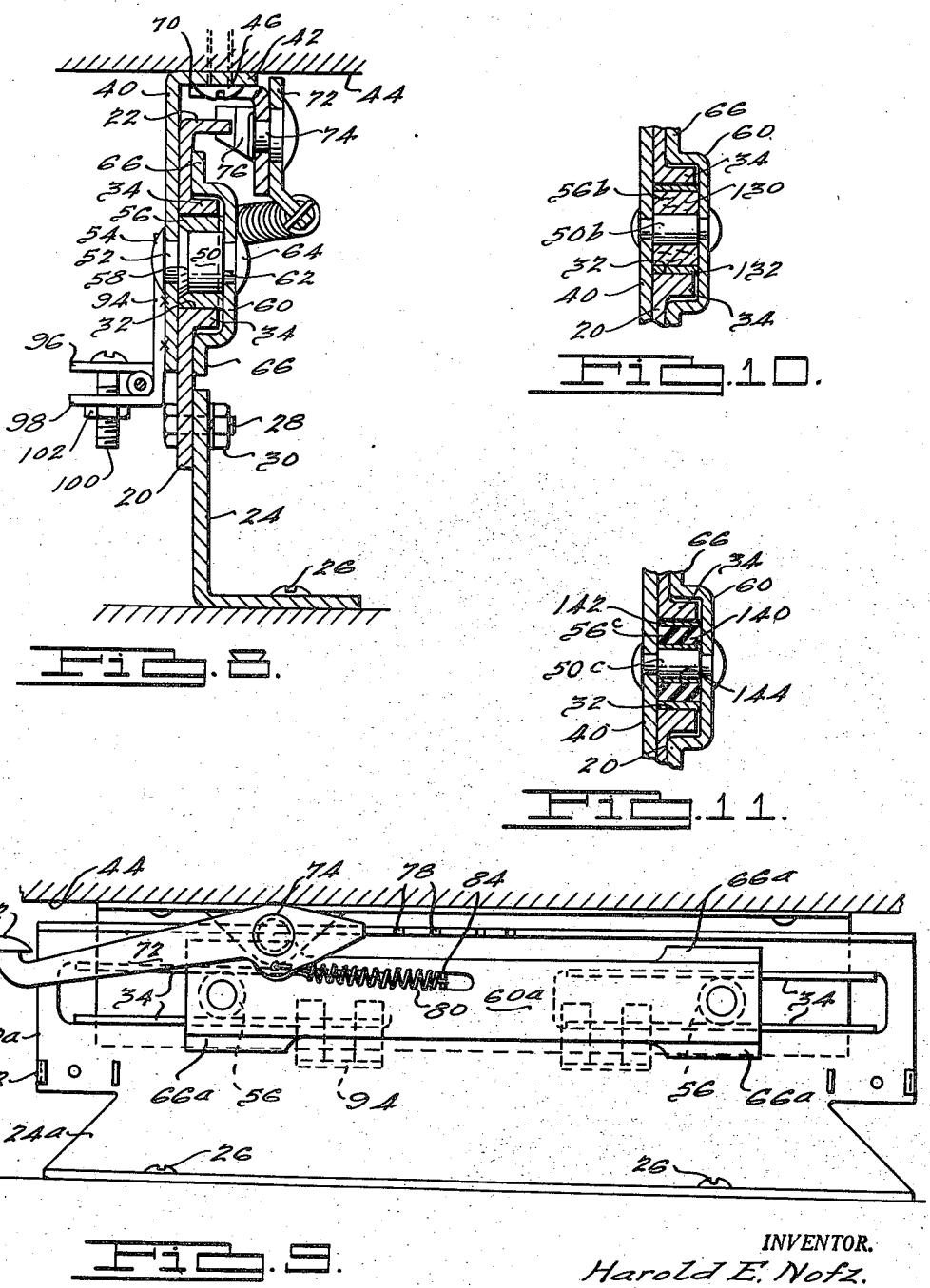
INVENTOR.
Harold E. Nofz.
BY
Harness, Dickey & Pierce.
ATTORNEYS.

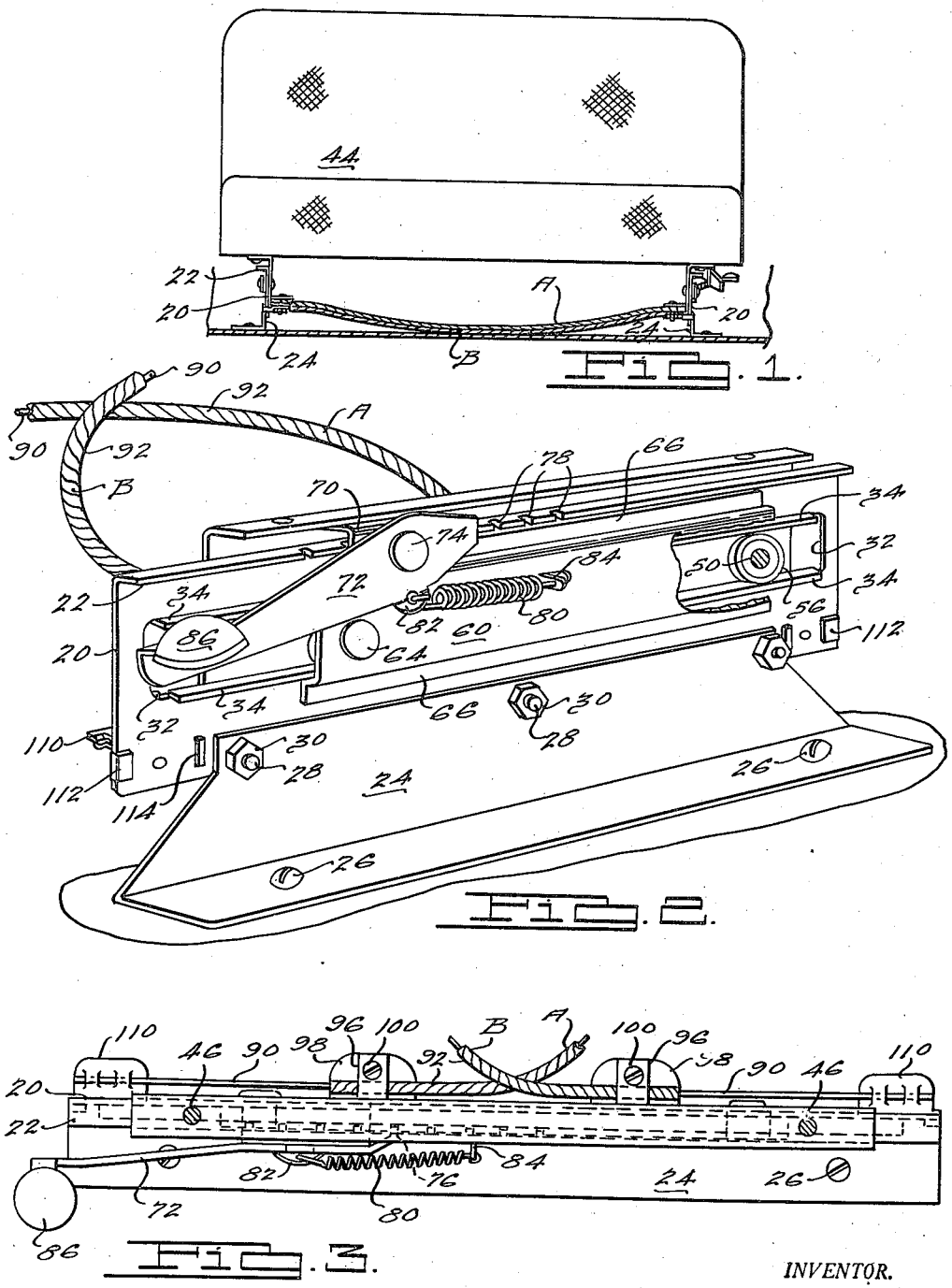

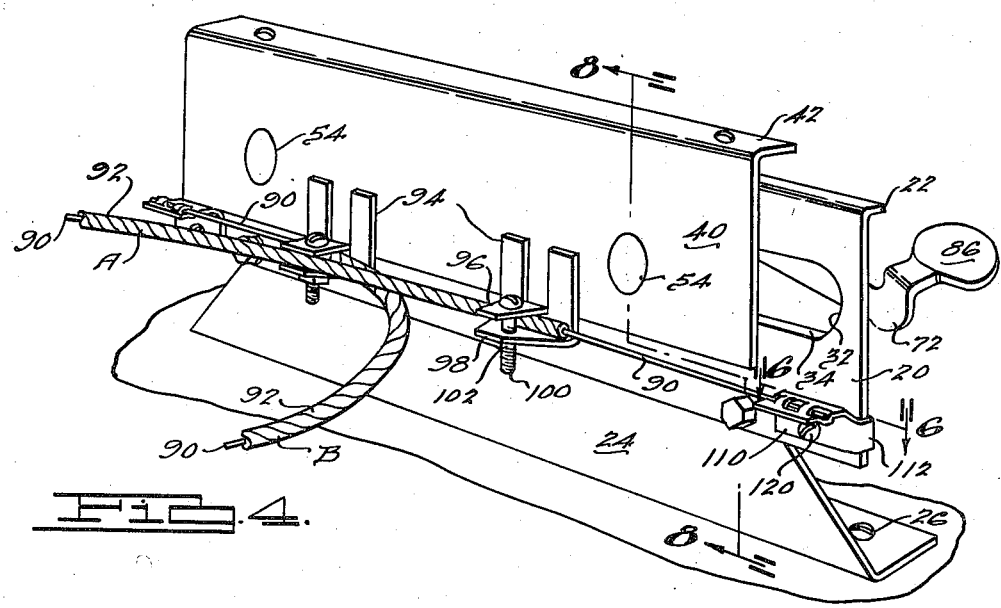
Fig. 4.
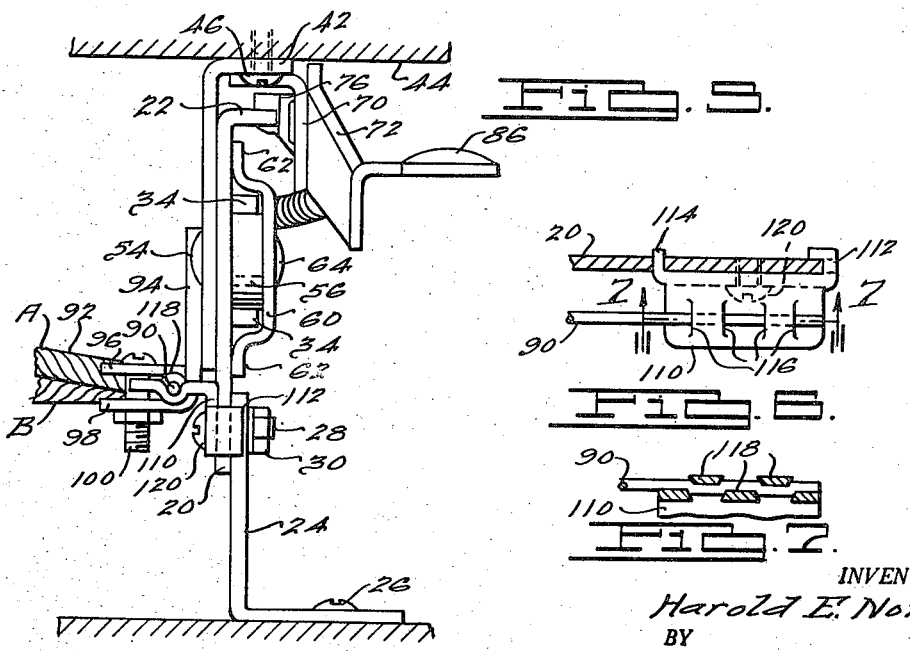
Fig. 5.
Fig. 6.
Fig. 7.
INVENTOR.
Harold E. Nofz.
BY
Harness, Dickey & Pierce.
ATTORNEYS.

Patented Aug. 3, 1948

2,446,241

UNITED STATES PATENT OFFICE 2,446,241

SEAT SLIDE STRUCTURE

Harold E. Nofz, Detroit, Mich., assignor to National Stamping Company, Detroit, Mich., a corporation of Michigan Application May 7, 1945, Serial No. 592,501

9 Claims. (Cl. 308—6)

REISSUED

This invention relates to seat slide structures of the type employed for supporting the driver's seat of a motor vehicle for adjustment toward and from the steering wheel of such vehicle. It has for its principal object the provision of such seat slide structure of sturdy and improved characteristics.

Objects of the invention include the provision of a seat slide structure including a pair of units each of which comprises a pair of parts, one of which parts is adapted to be secured to the floor of the vehicle and the other of which is adapted to be secured to the seat thereof, such parts each including a vertical plate-like portion arranged with its plane of thickness vertical and the plate-like portion of each part being in substantial contact with that of the other cooperating part, the plate-like portion of one of the parts being longitudinally slotted and the other of the parts having pins secured thereto upon which rollers are mounted and received in the slots; the provision of a structure as above described in which the pins carry a plate at their free ends serving to anchor such free ends with respect to each other; the provision of a construction as above described in which the plate which connects the free ends of the pins is arranged to contact the slotted member above and below the rollers to resist the tendency of the pins to bend about their points of connection with the first-mentioned member; and the provision of a construction as above described in which the metal at the upper and lower edges of the slot in the second member is bent laterally to provide transversely directed integral flanged portions forming tracks for engagement with the rollers.

Other objects of the invention include the provision of a seat slide assembly including a pair of normally laterally spaced units each embodying a track and a slide, together with a pair of Bowden wire assemblies interconnecting them for insuring equal and simultaneous movement of both slides on their respective rails, the Bowden wire assemblies being readily detachable from and applicable to the units whereby to permit them to be shipped independently of, or at least disconnected from the units and be readily assembled to the units by the purchaser, this enabling a relatively small shipping package containing both the units and the Bowden wire assemblies to be used.

Further objects include the provision of a seat slide structure of the general type above described including a novel form of roller construction for cooperation therewith; the provision of a construction of the above described type including rollers formed at least in part of non-metallic material; and the provision of a construction above described in which the rollers cooperate with the remaining portion of the structure in a new and novel manner.

The above being among the objects of the present invention the same consists in certain new and novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a front elevational view of the driver's seat of a motor vehicle supported from the floor thereof by a seat slide structure embodying the features of the present invention;

Fig. 2 is an enlarged perspective view of the right-hand seat slide unit shown in Fig. 1, showing the outside face of the same;

Fig. 3 is a plan view of the unit shown in Fig. 2;

Fig. 4 is the perspective view of the unit shown in Figs. 2 and 3 but showing the inner side thereof;

Fig. 5 is a front elevational view of the unit shown in the preceding view;

Fig. 6 is an enlarged, fragmentary, horizontal sectional view taken on the line 6—6 of Fig. 4 and illustrating the method of connecting the ends of the Bowden wires to the structure;

Fig. 7 is a vertical sectional view taken on the line 7—7 of Fig. 6;

Fig. 8 is an enlarged, vertical sectional view taken transversely of the unit shown in Fig. 4 as on the line 8—8 thereof;

Fig. 9 is a side elevational view of the unit shown in the preceding view and illustrating a modified form of construction; and, Figs. 10 and 11 are enlarged fragmentary sectional views taken in the same plane as Fig. 8 and illustrating modified forms of roller structures.

As in conventional types of seat slide structures the device of the present invention includes two units, one of which is positioned under each side of the seat to be shiftably supported and each unit comprises a rail structure adapted to be fixed to the floor of the vehicle and a cooperating slide structure adapted to be secured to the seat, the two structures being arranged for relative sliding movement with respect to each other longitudinally of the vehicle to permit the seat to be correspondingly shifted therewith.

In accordance with the present invention, the rail at the side of each unit includes a pair of plate-like members arranged with their planes vertical and arranged in substantial contact with each other and slidably interconnected with each other by means of rollers fixed to one thereof and engaged in a slot or slots in the other thereof. In the broader aspects of the invention it makes no difference whether the rollers are secured to the slide or the rail, and whether it is the rail or the slide which is slotted to receive the rollers, but preferably, and as shown by way of illustration in the drawings, the rollers are carried by the slide and it is the rail that is slotted to receive them.

Furthermore, it is unimportant as far as the present invention is concerned whether the rail is formed for direct engagement with the floor of the vehicle or whether it is provided with separate supporting means, such as legs or the like, for supporting it in spaced relation with respect to the floor, the latter construction being shown as preferred in the accompanying drawings and the former construction being shown by way of modification.

Additionally, it will be appreciated that the rail may be supported from the floor so as to cause the slide and consequently the seat supported by it to be raised with respect to the floor as the seat is shifted forwardly, or is maintained at a substantially constant distance from the floor during such shifting movement. The latter construction is shown in the drawings by way of preference.

In seat slide structures of the type under consideration it is usually preferable to connect the two units which support a seat in such a manner that the slides are caused to move equally in the same direction when the seat is shifted. Although in the broader aspects of the present invention any suitable or conventional means may be provided for this purpose, the particular means shown and which is preferred consists of a Bowden wire structure as broadly disclosed and claimed in United States Letters Patent No. 2,360,805 owned by the assignee of the present invention.

It will also be understood that the two units employed for supporting the seat are identical to each other except reversed in direction, that is, one is right hand and one is left hand, and except for the fact that one of the units, usually the lefthand unit as viewed looking toward the front of the vehicle, is provided with means for latching the rail and the slide together in slidably adjusted position. For this reason the lefthand unit only is shown in detail in the drawings, the construction of the righthand one being made apparent to those skilled in the art therefrom.

Referring now to the drawings it will be noted that the rail 20 comprises an elongated flat metal plate arranged with its plane of thickness vertical and its upper marginal edge is outwardly flanged as at 22 in perpendicular relationship with respect thereto. In the particular case shown the rail 20 is adapted to be supported from the floor by means of an angle member 24, one flange of which is adapted to rest in flat contacting relationship with respect to the floor and to be fixed thereto as by means of screws or bolts 26, the vertical leg of the angle overlapping the outer marginal face of the rail 20 and being secured thereto by means of screws 28 and nuts 30. Intermediate its upper and lower edges the rail 20 is longitudinally slotted to provide track means for the rollers carried by the slide and in this connection the rail 20 may be provided with a single elongated slot, but preferably in the interests of rigidity and strength it is provided with two slots 32, each extending from a point adjacent the midpoint of length of the rail 20 toward but short of the corresponding end thereof, the two slots being longitudinally aligned with one another.

In accordance with the present invention a portion of the metal struck out from the plate 20 to form the slots 32 is allowed to remain integrally connected to the plate 20 and is outwardly bent along the upper and lower edges of each slot 32 to provide flanges or tracks 34 directed at right angles to the plane of thickness of the plate 20. The flanges or tracks 34 are all of the same width and in forming them, after the initial operation of punching out the metal for the slots 32 and bending the rails or flanges 34 outwardly, they are preferably subjected to a coining operation whereby to square up their inner surfaces into flat and exact perpendicularity with respect to the plane of the plate 20 and are preferably simultaneously thickened as best shown in Fig. 8. This results in a roller engaging face for the rails or flanges 34 providing maximum width of contact between them and the cooperating rollers and at the same time renders the track 34 more rigid and aids in reinforcing the rail 20 against distortion. In coining the flanges or rails 34 the metal is work hardened to a material extent, thus conditioning them to better resist wear occasioned by travel of the rollers thereover and increasing the effective life thereof.

The slide 40 likewise comprises an elongated metal plate member arranged with its plane of thickness vertical and in parallel and in substantially contacting but slidable relationship with respect to the inner face of the rail 20. Its upper marginal edge is laterally flanged as at 42 to provide a bearing surface for the seat, which is indicated generally at 44, and to which it may be secured as by means of screws or bolts 46. The slide 40 may be of substantially the same length as rail 20 but is preferably somewhat shorter as indicated in the drawings.

At each of two points in the length of the slide 40, preferably corresponding with the distance between the mid-points of the two slots 32 in the rail 20, a pin 50, best brought out in Fig. 8, is fixed to the slide 40 in perpendicular relation to the plane thereof. The centers of the pins 50 are located at a distance below the flange 42 greater than the distance between the longitudinal center lines of the slots 32 from the flange 22 of the rail 20. As best brought out in Fig. 8 each pin 50 is provided with a reduced neck portion 52 which projects through a correspondingly sized hole in the slide 40 and outwardly of the inner face of the slide 40 is headed over as at 54 to rigidly fix the pin 50 to the slide 40.

Each pin 50 rotatably receives thereon a roller 56. The rollers 56 are of an outside diameter such as to be relatively closely but rotatably confined between the tracks 34 of the corresponding slots 32 but with a minimum clearance between the cooperating tracks, this last feature being in the interest of eliminating possible rattle between the parts due to undesirable relative vertical movement between the rail and the slide. Preferably, and as brought out in Fig. 8, the pin 50 at its point of junction with the neck 52 is formed to provide an outwardly flared frustoconical surface 58, and the inner end of the bore of the roller 56 is formed complementary thereto, thus to provide thrust surfaces between the rollers 56 and the pins 50 serving to maintain the inner ends of the rollers 56 out of rubbing contact with the slide 40.

In accordance with the present invention the outer ends of the pins 50 are interconnected by a plate member 60 and while in the broader aspects of the invention the method of securing the plate member 60 to the pins 50 is immaterial as long as it is of a rigid nature, in the particular construction shown each pin 50 at its outer end is provided with a concentric cylindrical neck 62 of reduced diameter which is closely received in a hole provided therefor in the plate member 60, and outwardly of the plate member 60 is headed over as at 64 thus to securely fix the plate member 60 to the pins 50. The plate member 60 extends above and below the cooperating tracks 34 beyond which it is inwardly bent and then laterally flanged as at 66 to provide flanges having flat inner surfaces substantially contacting the inner face of the rail 20. Preferably the space between the inner faces of the flanges 66 and the outer face of the slide 40 is just sufficiently greater than the thickness of the rail 20 to provide running clearance of the rail 20 therebetween. A clearance of from 5 to 10/1000 of an inch is preferable in this respect. It may also be noted that the length of the rollers 56 is such as to provide a minimum of end clearance between them and the plate 60 commensurate with free turning characteristics of the rollers on the pins 50.

The importance of the plate member 60 is that in constructions of the character shown if the outer ends of the pins 64 are not braced in some manner the pins will tend to bend about their point of connection with the slide when a load is applied thereto and because of the clearance necessarily required between the rollers 56 and the tracks 34 or their equivalent such bending will result in point contact between the rollers and the opposite sides of the slot or track and may cause the rollers to jam in the slots, and in any event to foster early destruction of the rollers and the track forming members. The plate member 60 not only anchors the free ends of the pins 50 together, which in itself aids in rigidifying the same, but in being provided with the flanges 66 which lie in substantially contacting relationship with respect to the rail 20, any tendency of the pins to bend at their points of connection with the slide 40 is resisted by engagement of at least one of the flanges 66 with the rail 20. The flanges 66 in bearing against the rail 20 at a distance from the centers of the pins 50 much greater than the radius of the rollers 56, and being normally closely spaced from the rail, will contact the rail 20 upon yielding of the pins 50 before the rollers 56 cock enough to jam between the tracks 34. As a result, with the construction shown and described the plate member 60 serves in the nature of an outboard support for the outer ends of the pins 50, aids in maintaining line contact between the rollers 56 and the track 34 with all of the attendant advantages in operation, and positively precludes jamming of the rollers 56 in the slots 32 under all conditions.

As previously explained the lefthand unit of the seat slide, namely that one shown in detail in the accompanying drawings, is provided with latch means for releasably latching the slide in longitudinally adjustable position on the rail. In the case shown this latch mechanism comprises an angle bracket 70 having one flange thereof fixed in flat contacting relationship with respect to the lower face of the flange 42 at the upper edge of the slide 40 and its remaining flange projecting downwardly in parallel relation with respect to the body of the slide 40 and in outwardly spaced relation with respect thereto. A latch member 72 is pivotally connected to the downwardly extending leg of the bracket 70 by means of a pin 74.

The latch member 72 is formed from a flat piece of metal and its rear end is bent inwardly as at 76 so as to project inwardly beyond the outer free edge of the flange 22 on the rail 20. Such flange 22, as best brought out in Fig. 2, is provided with a plurality of notches 78 therein arranged in spaced relation with respect to each other longitudinally of the flange 22, the notches 78 each being of a sufficient width and depth to receive the inwardly bent end 76 of the latch member 72 therein. A coil spring 80 maintained under tension between an ear 82 formed on the latch member 72 below the pin 74, and an outwardly struck ear 84 provided on the plate member 60, constantly urges the latch member 72 toward operative engagement with the flange 22. Pivotal movement of the latch member 72 in this direction may be limited by contact with the latch member 72 with the lower surface of the seat 44 or by any other suitable means.

The forward end of the latch member 72 is formed to provide an outwardly projecting thumbpiece 86 by means of which the operator may draw such end upwardly against the force of the spring 80 and release the inwardly bent end 76 of the latch member 72 from engagement with a cooperating notch 78, thereby releasing the slide for movement longitudinally of the rail. When the desired slidable position is reached, release of pressure on the end 86 of the latch member 72 will permit the spring 80 to project the end 76 of the latch member 72 into the next notch 78 brought into alignment therewith, thereby to latch the slide to the rail in its longitudinally adjusted position.

As previously explained, while any suitable or conventional type of means may be employed between the two units of the seat slide structure described for insuring equal and simultaneous movement of both slide members when the seat is shifted, the means illustrated in the drawings is essentially that disclosed and claimed in United States Letters Patent No. 2,360,805. In other words it comprises a pair of Bowden wire assemblies, one of which is indicated at A and the other of which is indicated at B. Each Bowden wire assembly includes a flexible wire 90 enclosed in a tubular flexible casing 92, the wires 90 being longer than the corresponding casings 92 so as to project beyond the ends of the latter.

One end of the casing 92 for the Bowden wire assembly A is clamped to the slide 40 of the lefthand unit (as viewed from the driver's seat), and as best brought out in Fig. 4 in parallel relation with respect to the direction of slidable movement of the slide 40 on the rail 20, and in rearwardly spaced relation with respect to the forward end of the slide 40. The cooperating wire 90 is extended forwardly therefrom and is anchored to the forward end of the corresponding rail 20. The opposite end of the casing 92 of the Bowden wire assembly A is clamped to the other slide 40 in a rearwardly facing direction and the corresponding end of the corresponding wire 90 is anchored to the rear end of the corresponding rail 20. Similarly the rear end of the casing 92 of the Bowden wire assembly B is clamped to the slide 40 of the lefthand assembly, as indicated in Fig. 4, in a rearwardly facing direction, and its corresponding wire 90 is anchored to the rear end of the corresponding rail 20. Similarly, the forward end of the casing 92 of the Bowden wire assembly B is anchored to the opposite slide 40 in the same manner as shown for the forward end of the casing for the Bowden wire assembly A of Fig. 4.

It will be appreciated that by interconnecting the two seat slide units by the Bowden wire assemblies A and B in the manner described, when the latch 72 is released and one slide 40 is moved on its corresponding rail 20 the corresponding ends of the Bowden wire casings 92 are shifted simultaneously therewith and relative to the enclosed wires 90 mentioned. If, for instance, one of the slides 40 is moved forwardly, as for instance the slide shown in Fig. 4, the casing 92 for the Bowden wire assembly B will be slid along its corresponding wire 90, and its opposite end, in moving forwardly, will cause the opposite slide 40 to move forwardly therewith. Similarly the casing 92 for the Bowden wire A, in moving forwardly on its wire 90, will draw its opposite end forwardly on the corresponding wire 90 and act in the same manner to move the opposite slide 40 in the same direction and for an equivalent distance. Two such Bowden wire assemblies are preferably employed for the reason that the type of Bowden wire assembly employed is one in which the casing 92 is formed as a closely wound coil capable of taking compression through it but incapable of taking a material amount of pull. In such case by employing two Bowden wire assemblies positive movement between the two slides 40 is always insured through axial compressive stresses transmitted through one of the casings 92, regardless of the direction of movement of the slides.

In the particular case shown in the drawings by way of illustration, each casing 92 of the Bowden wire assemblies A and B is secured to its corresponding slide 40 by a bracket indicated generally at 94. Each bracket is formed from a flat sheet of metal which is slit in parallel and spaced relation from one edge thereof toward the opposite edge thereof, and the portion between the slits is bent into perpendicular relationship with respect to the plane of the plate to form an ear 96. The edge of the plate opposite that edge from which the above described slits are extended is then bent up into parallel and spaced relationship with respect to the ear 96. The ears 96 and 98 are spaced from one another by approximately the diameter of the casing 92 and an end of one of the casings 92 is received between the ears 96 and 98 of each bracket 94. A screw 100 is projected through the ears 96 and 98 outwardly of the end of the casing 92 received therein and cooperates with a nut 102 to draw ears 96 and 98 towards each other, thus to securely clamp the cooperating end of the casing 92 therebetween. Of course, and as illustrated in the drawings, the brackets 94 are suitably fixed to the slides 40, as by spot welding or the like, and in such position that the planes of the ears 96 and 98 are parallel to the direction of movement of the slides 40 on the rail 20, the two legs provided on the bracket by bending the tongue 96 from between them being arranged in flat contacting relationship with respect to the inner face of the corresponding rail, and the ears 96 and 98 projecting perpendicularly outwardly therefrom.

In order to anchor the ends of the wires 90 to the corresponding ends of the rails 20 brackets 110 are provided. As perhaps best brought out in Figs. 4, 5, 6, and 7 each bracket 110 is formed of sheet metal into an L-sectioned shape. At one end each bracket 110 is provided with an extended end or ear 112 which is hooked around the corresponding end of the corresponding rail 20. As best shown in Fig. 6 the ends of the rails 20 are notched to receive the ears 112 to aid in holding the corresponding brackets 110 in position. An extended end or ear 114 at the opposite end of each bracket 110 is bent inwardly and is projected through a corresponding hole formed for reception of same in the corresponding rail 20, as also best brought out in Fig. 6, to further aid in holding the brackets 100 in position on the rails.

The outwardly projecting flange of each bracket 110 is provided, at spaced intervals in the length thereof and between its inner and outer edges, with a plurality of transverse slits 116, and the metal between alternate pairs of slits 116 is bent upwardly and downwardly to form alternately oppositely directed straps 118, between which the ends of the corresponding wire 90 is projected. Then, as brought out in Fig. 7, the straps 118 on opposite sides of the wire are displaced toward one another so as to bend the wire 90 into interlocking relation with respect thereto. Preferably a screw such as 120 is projected through each bracket 110 and threaded into the corresponding rail 20 to aid the ears 112 and 114 in removably securing the brackets 110 in place on the rails 20.

With the described method of securing the Bowden wire assemblies to the seat slide unit it is possible to ship the unit to the customer with the Bowden wire assemblies separate therefrom and with the brackets 110 fixed to the ends of the wires 90. The customer may then simply insert the ends of the casings 92 of the Bowden wire assemlies A and B in their proper positions and relation in the brackets 94 and slip the brackets 110 over the corresponding ends of the corresponding rails 20 and by simply inserting and tightening up the screws 100 and 120 operatively connect an associated pair of seat slide units together. By this means a considerable amount of space is saved in shipping.

In Fig. 9 a modified form of the construction is shown. In this figure parts identical to the parts of the structure previously described are indicated by the same numerals, and the parts which have been changed and which correspond to the parts above described are indicated by the same numerals but bearing a sub-letter "a." Accordingly, a description of the changed parts will suffice, in view of the above description, to fully describe the modified construction. In this case the rail 20a and part 24a are formed integrally with each other and from a single sheet of metal. The plate member 60a instead of having side flanges such as 66 in the first described construction extending the full length thereof, in this case has shortened flanges 66a at each end thereof and extending a short distance on both sides of the corresponding rollers 56 to serve the same purpose as the flanges 66 in the first described construction. Some saving in weight and metal may be effected by such modification.

In Figs. 10 and 11 modified roller structures are shown, each of which embodies a non-metallic part and which may therefore be less noisy in operation, particularly in worn condition. Inasmuch as the only difference in the construction shown in Figs. 10 and 11 is in connection with the rollers themselves and the supporting pins therefor, only these changes will be described, the remainder of the structure already being understood.

In Fig. 10 the roller, indicated generally at 56b, comprises an annular body 130 of a suitable type of hard wood, such as lignum vitae, which has preferably been impregnated with a suitable lubricant. It is surrounded by a ring 132 of metal, such as steel, bronze, or the like preferably pressed thereon. The shouldered pin 50b which supports the roller 56b is of somewhat similar construction to the pin 50 first described except that it is smaller in diameter and is not provided with a shoulder corresponding to the shoulder 58, but it is secured to the slide 40 and to the plate member 60 in a similar manner. The roller 56b is, of course, equivalent to the roller 56 first described in diameter and in axial extent.

In the construction illustrated in Fig. 11 the roller 56c which is equivalent in diameter and axial extent to the roller 56 first described comprises an annular body 140 of rubber or the like encircled by a metallic ring 142 and lined with a bearing liner 144, the latter preferably being of the porous sintered metal type which has been impregnated with a suitable lubricant. Preferably the ring 142 and liner 144 are vulcanized to the body 40 or otherwise suitably fixed thereto. The pin 50c may be substantially identical to the pin 50b above described.

Having thus described my invention, what I claim by Letters Patent is:

1. In a seat slide structure, in combination, a supporting unit comprising a rail member and a slide member, said members each comprising an elongated substantially flat sheet metal portion arranged with its plane of thickness vertical and said portions being arranged in slidable but substantially contacting relation with respect to each other, one of said members having longitudinally extending slot means formed therein, the metal of said member along the upper and lower edges of said slot means being bent out of the plane of said member whereby to provide a track means of greater width than the thickness of said member, the other of said members having pins fixed thereto and projecting perpendicularly therefrom, and rollers received on each of said pins within said slot means and in supported relation with respect to said track means, and outboard support means carried by the pins and engageable with said slotted member to hold said rollers aligned properly in the track means.

2. In a seat slide structure, in combination, a supporting unit comprising a rail member and a slide member, said members each comprising an elongated substantially flat sheet metal portion arranged with its plane thickness vertical and said portions being arranged in slidable but substantially contacting relation with respect to each other, one of said members having longitudinally extending slot means formed therein, the metal of said member along the upper and lower edges of said slot means being bent out of the plane of said member whereby to provide a track means of greater width than the thickness of said member and of greater thickness than the thickness of said member, the other of said members having pins fixed thereto and projecting perpendicularly therefrom, and rollers received on each of said pins within said slot means and in supported relation with respect to said track means, and outboard support means on the distal ends of the pins engageable with said slotted member to prevent cocking of the pins and jamming of said rollers.

3. In a seat slide structure, in combination, a supporting unit comprising a rail member and a slide member, said members each comprising an elongated substantially flat sheet metal portion arranged with its plane of thickness vertical and said portions being arranged in slidable but substantially contacting relation with respect to each other, one of said members having longitudinally extending slot means formed therein, the metal of said member along the upper and lower edges of said slot means being bent out of the plane of said member whereby to provide a track means of greater width and hardness than said member and of greater thickness and the thickness of said member, the other of said members having pins fixed thereto and projecting perpendicularly therefrom, and rollers received on each of said pins within said slot means and in supported relation with respect to said track means, and an outboard support fastened to the projecting distal ends of said pins holding the latter fixed with respect to each other and having portions disposed substantially in contacting relationship with said slotted member to prevent cocking of the pins and jamming of said rollers.

4. In a seat slide structure, in combination, a rail member and a slide member, said members each comprising elongated flat sheet metal portions arranged with their planes of thickness vertical and in substantial contact with each other, one of said members being provided with slot means extending longitudinally thereof, pins fixed with respect to the other of said members with their axes perpendicular to the plane of said portion thereof and projecting through said slot means, rollers on said pins within said slot means, and a plate member fixed to and interconnecting the free ends of said pins.

5. In a seat slide structure, in combination, a rail member and a slide member, said members each comprising elongated flat sheet metal portions arranged with their planes of thickness vertical and in substantial contact with each other, one of said members being provided with slot means extending longitudinally thereof, pins fixed with respect to the other of said members with their axes perpendicular to the plane of said portion thereof and projecting through said slot means, rollers on said pins within said slot means, a plate member fixed to and interconnecting the free ends of said pins, and marginal portions on said plate member positioned for operative engagement with the first-mentioned member above said slot means therein.

6. In a seat slide structure, in combination, a rail member and a slide member, said members each comprising elongated flat sheet metal portions arranged with their planes of thickness vertical and in substantial contact with each other, one of said members being provided with slot means extending longitudinally thereof, pins fixed with respect to the other of said members with their axes perpendicular to the plane of said portion thereof and projecting through said slot means, rollers on said pins within said slot means, a plate member fixed to and interconnecting the free ends of said pins, and marginal portions on said plate member arranged in substantial engagement with the first-mentioned member above and below said track means and serving to resist bending of said pins with respect to said second-mentioned member.

7. In a seat slide structure, in combination, a rail member and a slide member, said members each comprising elongated flat sheet metal portions arranged with their planes of thickness vertical and in substantial contact with each other, one of said members being provided with slot means extending longitudinally thereof, pins fixed with respect to the other of said members with their axes perpendicular to the plane of said portion thereof and projecting through said slot means, rollers on said pins within said slot means, a plate member fixed to and interconnecting the free ends of said pins, and marginal flanges on said plate member extending into substantially flat engaging relationship with respect to the body of the first-mentioned member above and below said track means thereon.

8. In a seat slide structure, a rail and a slide having vertical overlapping portions, one of said portions provided with slot means, horizontal pins carried by the other of said portions and extending through said slot means, rollers on the pins and within said slot means, and outboard support means carried by the pins and engageable with said slotted portion to prevent the pins from cocking and the rollers from jamming in said slot means.

9. In a seat slide structure, independently movable rail and slide members having vertical overlapping portions, one of said portions provided with longitudinal slot means, pins carried by the other of said portions extending through said slot means, rollers on said pins adapted to travel in said slot means, and an outboard support fastened to and connecting the distal ends of said pins whereby to hold the latter fixed with respect to each other and having portions disposed substantially in contacting relationship with the slotted member whereby to prevent cocking of the pins and jamming of the rollers in said slot means.

HAROLD E. NOFZ.

REFERENCES CITED

The following references are of record in the file of this patent:

UNITED STATES PATENTS

| Number | Name | Date |
|---|---|---|
| 1,735,518 | Von Valkenburg et al. | Nov. 12, 1929 |
| 2,240,143 | Lustig | Apr. 29, 1941 |
| 2,272,536 | Votypka | Feb. 10, 1942 |
| 2,360,805 | Thoma | Oct. 17, 1944 |

Certificate of Correction

Patent No. 2,446,241.                                                August 3, 1948.

HAROLD E. NOFZ

It is hereby certified that errors appear in the printed specification of the above numbered patent requiring correction as follows: Column 6, line 46, for "side" read *slide*; column 10, line 20, claim 3, for "and", second occurrence, read *than*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*